(12) United States Patent
Vollkommer et al.

(10) Patent No.: US 6,172,467 B1
(45) Date of Patent: Jan. 9, 2001

(54) METHOD AND DEVICE FOR PRODUCING SERIES OF IMPULSE VOLTAGES TO OPERATE DISCHARGE LAMPS AND CIRCUIT PERTAINING THERETO

(75) Inventors: Frank Vollkommer, Buchendorf; Lothar Hitzschke, Munich, both of (DE)

(73) Assignee: Patent-Treuhand-Gesellschaft fuer elektrische Gluehlampen mbH, Munich (DE)

(*) Notice: Under 35 U.S.C. 154(b), the term of this patent shall be extended for 0 days.

(21) Appl. No.: 09/284,289
(22) PCT Filed: Jul. 16, 1998
(86) PCT No.: PCT/DE98/01992
  § 371 Date: Apr. 12, 1999
  § 102(e) Date: Apr. 12, 1999
(87) PCT Pub. No.: WO99/08491
  PCT Pub. Date: Feb. 18, 1999

(30) Foreign Application Priority Data

Aug. 12, 1997 (DE) .............................. 197 34 885

(51) Int. Cl.[7] .................................................. H05B 41/16
(52) U.S. Cl. .......................................... 315/246; 315/250
(58) Field of Search .................................... 315/246, 226, 315/307, 209 R, 199, 291, 207, 99, 94, 46; 363/132

(56) References Cited

U.S. PATENT DOCUMENTS

| | | | |
|---|---|---|---|
| 3,896,336 | * 7/1975 | Schreiner et al. | 315/226 |
| 4,165,475 | * 8/1979 | Pegg et al. | 315/99 |
| 4,170,747 | * 10/1979 | Holmes | 315/307 |
| 4,392,081 | * 7/1983 | Brown et al. | 315/46 |
| 4,429,359 | * 1/1984 | Anderson | 363/132 |
| 4,580,080 | * 4/1986 | Smith | 315/199 |
| 5,319,281 | * 6/1994 | Roth | 315/94 |
| 5,736,819 | * 4/1998 | Nilssen | 315/209 |
| 5,932,976 | * 8/1999 | Maheshwari et al. | 315/291 |
| 5,965,988 | * 10/1999 | Vollkommer et al. | 315/246 |
| 5,977,722 | * 11/1999 | Yokokawa et al. | 315/207 |
| 5,994,849 | * 11/1999 | Vollkommer et al. | 315/246 |

FOREIGN PATENT DOCUMENTS

| | | |
|---|---|---|
| 19548003 | 6/1997 | (DE) . |
| 9323975 | 11/1993 | (WO) . |
| 9423442 | 10/1994 | (WO) . |

* cited by examiner

Primary Examiner—Don Wong
Assistant Examiner—Chuc D Tran
(74) Attorney, Agent, or Firm—Carlo S. Bessone

(57) ABSTRACT

A method for producing pulsed-voltage sequences for the operation of discharge lamps (8) by means of a pulsed discharge which is impeded dielectrically provides that the pulsed-voltage sequence is composed of two partial voltage sequences in such a manner that the magnitudes of the peak values of each partial voltage sequence are less than the magnitudes of the peak values of the resultant pulsed-voltage sequence, for example half as large. This has the advantage that correspondingly less EMI is generated when the partial-voltage sequences are produced. In addition, the two partial voltage sequences contain rising flanks of opposite gradient with respect to a reference-earth potential, the two partial voltage sequences preferably being inverted with respect to one another. This provides ideal complete compensation for the electromagnetic interference (EMI) produced by the two partial voltage sequences, at least locally. A circuit arrangement for this purpose provides two pulse circuits (1; 2) which are connected in series and are synchronized with the aid of a timer circuit (3).

20 Claims, 4 Drawing Sheets

METHOD AND DEVICE FOR PRODUCING SERIES OF IMPULSE VOLTAGES TO OPERATE DISCHARGE LAMPS AND CIRCUIT PERTAINING THERETO

TECHNICAL FIELD

The invention relates to a method for producing pulsed-voltage sequences for the operation of discharge lamps by means of a pulsed discharge, which is impeded dielectrically, according to the precharacterizing clause of claim 1. The invention also relates to an electrical circuit arrangement for producing pulsed-voltage sequences according to this method. Finally the invention also relates to a lighting system according to the precharacterizing clause of the claim focused thereon with this circuit arrangement.

The term "discharge lamp" is also intended to cover those radiation sources which, in addition to electromagnetic radiation in the visible spectral band, that is to say light, also or even predominantly emit radiation in the UV or VUV bands.

The pulsed-voltage sequence can in principle be both unipolar and bipolar and is used for operating discharge lamps or radiators in which at least the electrodes of one polarity are impeded dielectrically, as is described, for example, in WO 94/23442. This method of operation uses a sequence, which is in principle unlimited, of voltage pulses during which predominantly electrical real power is injected, and which are separated from one another by pauses. The critical factors for the efficiency of the useful radiation production are, in principle, the pulse shape, in particular steep rises, as well as the time duration of the pulse times and pauses. The required peak values of the voltage pulses are typically one to several kilovolts—depending, inter alia, on the flash-over distance, on the nature and the pressure of the filling gas, as well as the nature and the thickness of the dielectric.

1. Prior Art

At present, these high voltage peaks in the kV region cannot reliably be switched and produced by means of a switching transistor. A pulse transformer is normally required for this purpose, and is connected into the output of the pulsed-voltage source.

The document DE 195 48 003 A1 has already disclosed such a circuit arrangement for producing pulsed-voltages sequences having one, and only one, pulse circuit. This pulse circuit essentially comprises a capacitor, a transistor and a pulse transformer. During the phase when the transistor is switched on, the energy stored in the capacitor is transferred to the pulse transformer. In the process, the pulse transformer transforms the pulsed voltage to the required peak values, although a number of disadvantages are associated with this. Firstly, the pulse transformer must be designed for the peak value of the pulsed-voltage sequence and is thus relatively large and expensive. In addition, the pulse load on the pulse transformer is relatively large and the winding capacitances, which are likewise relatively large, have an adverse effect on the pulse shape. A further disadvantage is that the full peak value of the pulsed-voltage sequence occurs on the supply leads of the secondary winding of the pulse transformer. The parasitic capacitances to the environment which are always present result in relatively high interference signals, so-called EMI (Electromagnetic Interference).

2. Description of the Invention

The object of the present invention is to avoid the said disadvantages and to provide a method according to the precharacterizing clause of claim 1, which produces less EMI.

This object is achieved by the characterizing features of claim 1. Particularly advantageous refinements are contained in the claims that are dependent on claim 1.

A further object of the present invention is to provide a circuit arrangement for carrying out this method. This object is achieved by the features of the independent claim which relates to the circuit arrangement. Further, particularly advantageous refinements are contained in the claims that are dependent thereon.

Finally, it is an object of the present invention to provide a lighting system according to the precharacterizing clause of the independent claim which relates to the lighting system and does not have the disadvantages mentioned. This object is achieved by the characterizing features of this claim.

The basic idea of the invention is that the pulsed-voltage sequence is composed of two partial voltage sequences in such a manner that the peak values of each partial voltage sequence are less than the peak values of the resultant pulsed-voltage sequence, for example only half as large. This has the advantage that correspondingly less EMI is generated when the partial voltage sequences are produced. In addition, one of the two partial voltage sequences contains positive rising flanks with respect to a reference-earth potential, and the other partial voltage sequence contains negative rising flanks with respect to this reference-earth potential. One of the two partial voltage sequences is preferably the inverse, with respect to the reference-earth potential, of the other partial voltage sequence. Ideally, the EMI produced by the two partial voltage sequences is completely compensated for at least locally. The higher peak values which are required for the discharge which is impeded dielectrically and, in consequence, the relatively severe EMI, are produced only where high peak voltages are actually required, namely at the load, that is to say between the electrodes of the radiation source itself.

According to the invention, this basic idea is implemented in the following method. Two partial sequences of voltage pulses are produced which are each separated from one another by pauses—also referred to in the following text as partial voltage sequences, for short—the two partial sequences having rising flanks with mutually opposite gradients with respect to a common reference-earth potential, for example earth. The two partial sequences are superimposed in such a manner that a difference sequence is produced. If required, the two partial sequences are synchronized to one another in such a manner that the peak values of the difference sequence are greater than the peak values of each of the two individual partial sequences of voltage pulses.

The individual pulses in the partial sequences may be either unipolar or bipolar. The term "bipolar pulse" means that the time-dependent voltage changes its mathematical sign once or more within such a pulse. Finally, according to the abovementioned method, this results in unipolar or bipolar difference sequences. The only critical factor in this case is that the corresponding pulses in the two partial sequences have (with respect to the common reference potential) rising flanks with mutually opposite gradients. In the bipolar case, the electrodes carry out both the role of the anode and the role of the cathode, depending on the phase of the pulse.

When defining the critical gradient of the rising flanks of the respective pulses, the intention is to ignore signal distortion, which frequently occurs in practice and in some cases is even unavoidable, such as overshoots or undershoots, noise components and the like which, however, generally make only an insignificant contribution (<50%) to the real power coupled to the lamp. The important factor for this analysis is, in fact, those time periods of the pulses during which the major real power inputs (>50%) take place.

In a preferred variant for the production of a difference sequence, one partial sequence of voltage pulses is formed by inverting the other partial sequence of voltage pulses. Synchronization is carried out in such a manner that the peak values of the difference sequence are the sum of the peak values of the partial sequences.

In a further variant, at least one of the two partial sequences of voltage pulses and/or the difference sequence have/has an offset DC voltage additively superimposed on them/it as an additional method step, the total offset DC voltage being chosen such that the discharge(s) can be extinguished after each voltage pulse, and undesirable restriking between the individual voltage pulses is avoided. Specifically, in this way, a relevant voltage element can be provided by the DC voltage. This has the advantage that the pulse circuits need be designed only for the residual voltage element.

The circuit arrangement according to the invention for producing pulsed-voltage sequences in accordance with the method described above comprises two series-connected pulse circuits (each having two output poles and one control input) as well as a timer circuit which is connected to the control inputs of the two pulse circuits. One of the two output poles of the first pulse circuit is connected to the output pole of opposite polarity of the second pulse circuit. The connection of the two said output poles defines the reference-earth potential with respect to the two free output poles of the two pulse circuits. In this way, the difference signal of the two signals which are in each case present between one free output pole and the reference-earth potential is present between the two free output poles. The reference-earth potential can be, but need not necessarily be, connected to the circuit earth or to earth potential.

The two pulse circuits are, for example, each constructed in accordance with the circuit disclosed in DE 195 48 003 A1. The advantage in this case over the prior art is that the transformation ratio, and in consequence the turns ratios, of the two transformers required for a peak voltage which can be predetermined are smaller, for example being only half as great in the case of a symmetrical design. This results in a further advantage that steeper voltage pulse flanks can be achieved and, in consequence, higher efficiency of useful radiation production.

In addition, in many cases in which until now it has been essential to use a transformer, it is possible to completely dispense with the use of transformers since, according to the invention, the doubled peak voltage, which can be produced per pulse circuit, is achieved.

The specific configuration of the pulse circuits will depend in the individual case on the required peak values at the electrodes. The advantageous effect of the circuit is governed primarily by the fact that the two pulse circuits are each suitable for supplying a partial sequence of voltage pulses separated from one another by pauses, the partial voltage sequences each containing rising flanks with mutually opposite gradients.

The timer circuit controls the two pulse circuits in such a manner that the two partial voltage sequences are synchronized to one another.

In one variant, at least one of the two free connecting poles of the pulse circuits is connected to the pole of the respectively opposite polarity of an offset DC voltage source. The offset DC voltage explained in one variant of the method is produced in this way.

In addition, protection is claimed for a lighting system which comprises the circuit arrangement according to the invention and a radiation source which is operated by means of a pulsed discharge, which is impeded dielectrically.

DESCRIPTION OF THE DRAWINGS

The invention will be explained in more detail in the following text with reference to an exemplary embodiment. In the drawings:

FIG. 1 shows a schematic illustration of the block diagram of the circuit arrangement according to the invention for producing pulsed-voltage sequences, and a flat radiator. The circuit arrangement essentially comprises a first pulse circuit 1 and a second pulse circuit 2 as well as a timer 3. Each of the two pulse circuits has in each case one control input a; d and two output poles b, c; e, f. In operation, the two pulse circuits 1, 2 each supply a partial voltage sequence $U_1$ and $U_2$, respectively, between their output poles b, c and e, f, respectively. Each of the two control inputs is connected to the timer 3. The timer 3 is used to synchronize the two pulse circuits 1; 2. The positive (+) output pole b of the first pulse circuit 1 and the negative (−) output pole f of the second pulse circuit 2 are connected to connections 4 and 5, respectively. The connections 4 and 5, respectively, are for their part connected via supply leads 6, 7 to the flat radiator 8. The respective free output poles c; e of the two pulse circuits 1, 2 are connected to one another as well as to earth potential, which is used as the reference-earth potential. In consequence, the two pulse circuits 1, 2 are connected in series, and a difference voltage sequence $U_3$ is produced, in operation, between the positive (+) output pole b of the first pulse circuit 1 and the negative (−) output pole f of the second pulse circuit 2.

Figure 1:
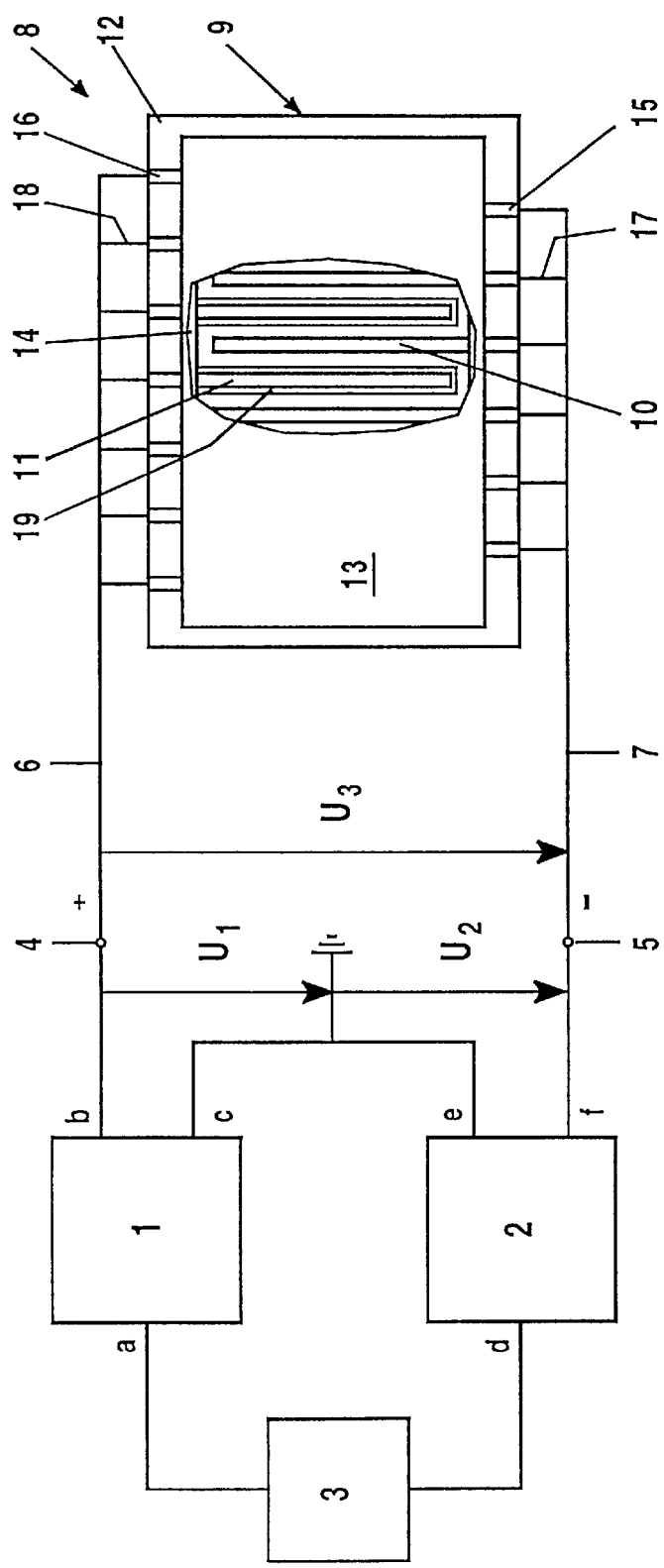
FIG. 1 shows a circuit arrangement according to the invention with a flat radiator.

The flat radiator 8 comprises a discharge vessel 9, cathodes 10 in the form of strips and anodes 11 in the form of strips, which are impeded dielectrically. The discharge vessel 9 comprises a base plate 12, a cover plate 13 and a frame 14, all of which have a rectangular base area. The base plate 12 and the cover plate 13 are connected in a gas-tight manner to the frame by means of glass solder, in such a manner that the interior of the discharge vessel 9 is formed in a cuboid shape. The base plate 12 is larger than the cover plate 13, such that the discharge vessel 9 has a free-standing rim all-round. The cathodes 10 and anodes 11 are arranged alternately and parallel to one another at a mutual separation of about 6 mm on the inner wall of the base plate 12. The cathodes 10 and anodes 11 are lengthened at mutually opposite ends and are passed out of the interior of the discharge vessel 9, to the outside, on the base plate 12 on both sides. On the rim of the base plate 12, the cathodes 10 and anodes 11 respectively merge into external electrical supply leads on the cathode side 15 and on the anode side 16, respectively. The external electrical supply leads 15, 16 are respectively connected by means of a short connecting piece 17, 18 to the supply leads 6, 7.

The aperture in the cover plate 13 serves only for illustrative purposes and makes it possible to see some of the anodes 11 and cathodes 10. In the interior of the discharge vessel 9, the anodes 11 are completely covered by a glass layer 19, whose thickness is about 250 $\mu$m. The electrodes 10; 11 and external contacts 15; 16 are produced as different sections of a cathode-side silver layer structure and an anode-side silver layer structure, which are applied jointly by means of a screen-printing technique, and subsequent burning-in. The layer thickness is about 6 $\mu$m.

In one variant (not illustrated), an offset DC voltage source is connected between the negative connection 5 and the associated supply leads 7.

Figure 2A:
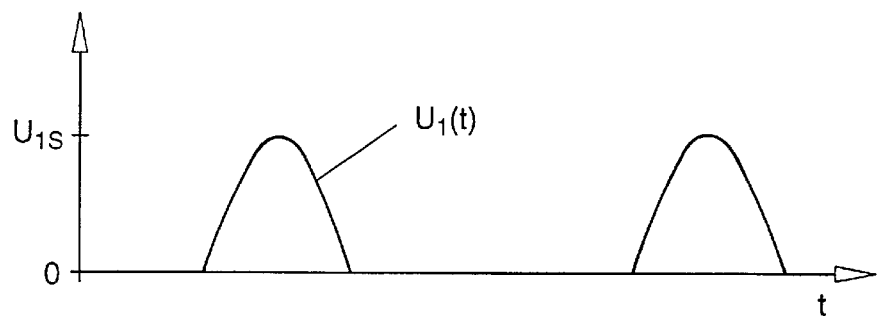
FIG. 2a shows a time detail of the partial voltage sequence $U_1(t)$ from FIG. 1 with unipolar pulses.
Figure 2B:
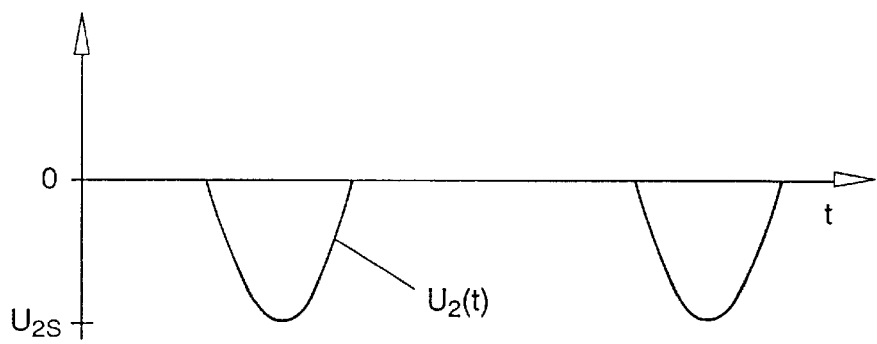
FIG. 2b shows a time detail of the partial voltage sequence $U_2(t)$ from FIG. 1 with unipolar pulses.
Figure 2C:
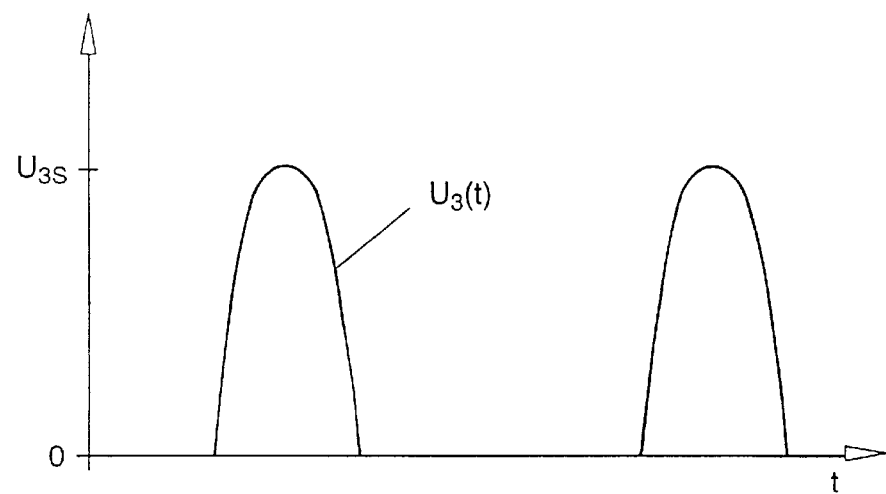
FIG. 2c shows a time detail of the difference voltage sequence $U_3(t)$ from FIG. 1.

FIGS. 2a to 2c each show time details of the two partial voltage sequences $U_1(t)$ and $U_2(t)=-U_1(t)$ as well as the difference sequence $U_3(t)$ from FIG. 1 schematically and by way of example. Each figure shows a half-sinusoidal voltage pulse with the peak value $U_{1S}$, $U_{2S}$ and $U_{3S}$, respectively, where $|U_{3S}|=|U_{1S}|+|U_{2S}|$.

Figure 3A:
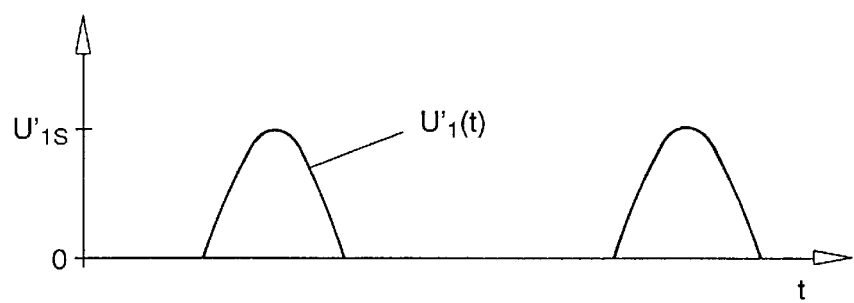
FIG. 3a shows a time detail of a further partial voltage sequence $U'_1(t)$.
Figure 3B:
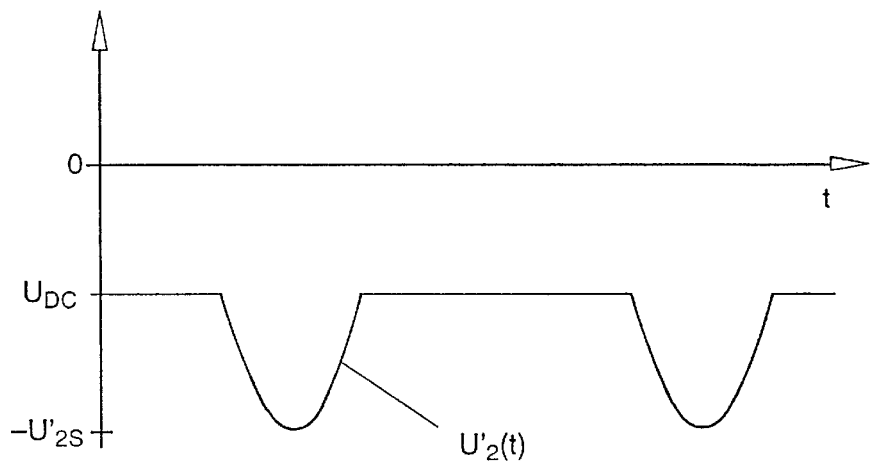
FIG. 3b shows a time detail of a further partial voltage sequence $U'_2(t)$.
Figure 3C:
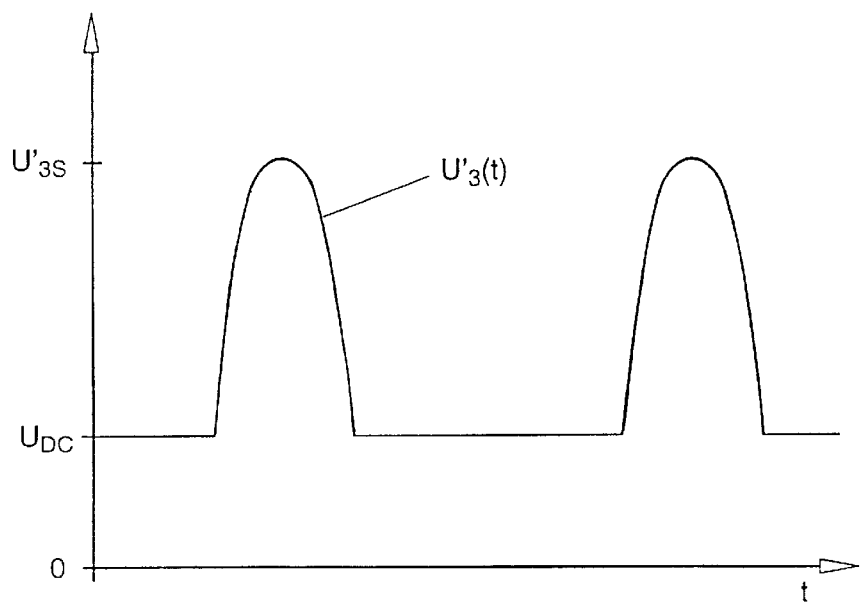
FIG. 3c shows a time detail of the difference voltage sequence $U'_3(t)$.

FIGS. 3a and 3b show two further partial voltage sequences $U'_1(t)$ and $U'_2(t)$ in idealized form. In contrast to FIG. 2b, an offset DC voltage of amplitude $U_{DC}$ in FIG. 3b is additively superimposed on the voltage signal. This likewise results in an offset DC voltage of amplitude $U_{DC}$, that is to say $|U'_{3S}|=|U'_{1S}|+|U'_{2S}|+U_{DC}|$, in the difference signal $U'_3(t)$.

Figure 4A:
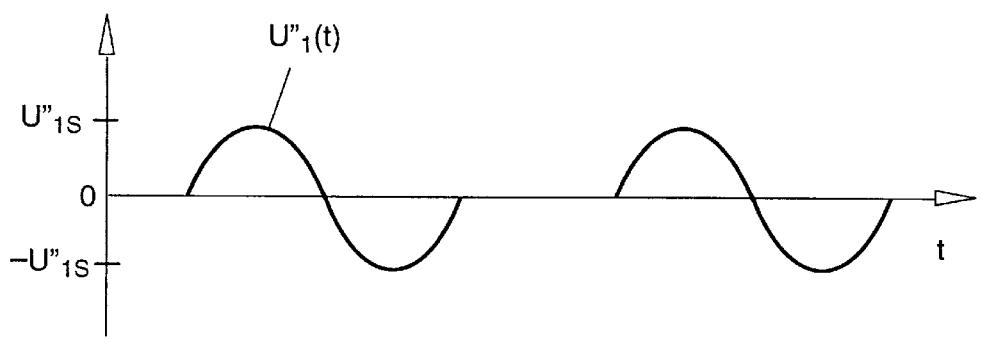
FIG. 4a shows a time detail of a partial voltage sequence with bipolar pulses $U''_1(t)$.
Figure 4B:
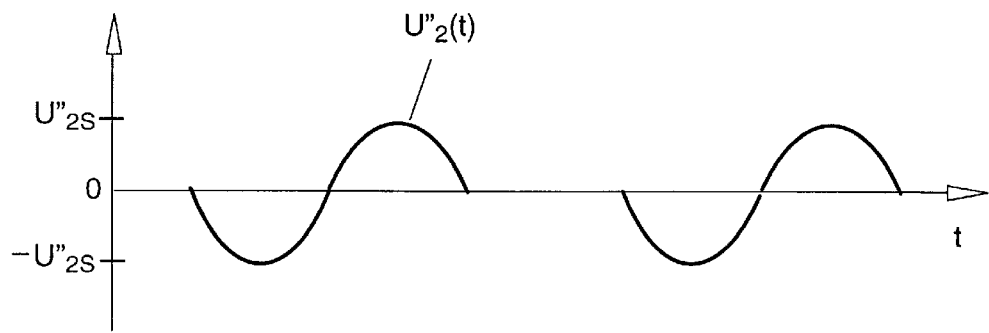
FIG. 4b shows a time detail of a partial voltage sequence with bipolar pulses $U''_2(t)$.
Figure 4C:
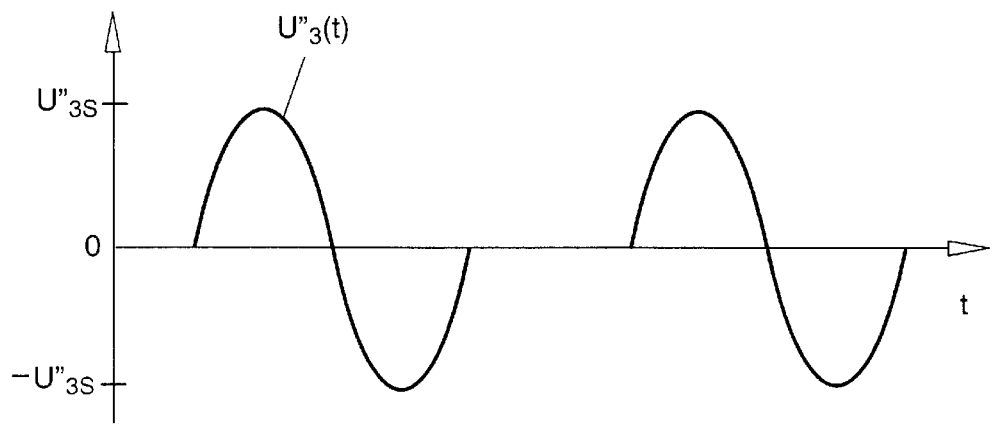
FIG. 4c shows a time detail of the difference voltage sequence $U''_3(t)$.

FIGS. 4a and 4b show two further partial voltage sequences $U''_1(t)$ and $U''_2(t)=-U''_1(t)$ in idealized form. In contrast to FIGS. 2a, 2b, these are partial voltage sequences with bipolar pulses (sinusoidal). As before, the individual bipolar pulses are separated from one another by pauses (in this case: voltage=zero). The resultant difference sequence $U''_3(t)$ likewise contains bipolar pulses with the two peak values $|U''_{3S}|=|U''_{1S}|+|U''_{2S}|$ and $-U''_{3S}$, where $U''_{1S}$ and $U''_{2S}$ denote the (positive and negative, respectively) peak values of the two partial voltage sequences.

The above idealized descriptions ignore the distortion that often occurs in practice, such as overshoots and undershoots and the like.

At this point, it should once again be mentioned that the signal shapes of the partial sequences $U_1$ to $U''_1$ as well as $U_2$ to $U''_2$ in FIGS. 2a to 4a and 2b to 4b have only an exemplary character. According to the invention, in particular all those signal shapes which are disclosed in WO 94/23442 are also suitable and can be produced by means of the circuit arrangement.

We claim:

1. Method for producing pulsed-voltage sequences for the operation of discharge lamps (8) by means of at least one pulsed discharge, having an at least partially transparent discharge vessel (9), which is closed and filled with a gas filling or is open and has a gas or a gas mixture flowing through it and is composed of electrically non-conductive material, and electrodes of a first polarity (10) and of a second polarity (11) at least the electrodes (11) of one polarity being isolated from the interior of the discharge vessel by means of dielectric material (19), characterized by the following method steps, providing a first partial sequence of voltage pulses which are separated from one another by pauses and have first peak values and have rising flanks which are positive with respect to the reference-earth potential, the reference-earth potential (0) being decoupled from the electrodes, providing a second partial sequence of voltage pulses which are separated from one another by pauses and have second peak values and have rising flanks which are negative with respect to the reference-earth potential (0), applying the first partial sequence of voltage pulses to the electrodes (11) of the first polarity (+), applying the second partial sequence of voltage pulses to the electrodes (10) of the second polarity (−), synchronizing of the two partial sequences of voltage pulses to one another in such a manner that a difference sequence of voltage pulses is produced between the electrodes (10, 11) of opposite polarity, the magnitudes of the peak values of the difference sequence being greater than the magnitudes of the peak values of each of the two individual partial sequences of voltage pulses.

2. Method according to claim 1, characterized in that the second partial sequence of voltage pulses is formed by inversion of the first partial sequence of voltage pulses, and in that the synchronization is carried out in such a manner that the magnitudes of the peak values of the difference sequence are the sum of the magnitudes of the peak values of the two partial sequences.

3. Method according to claim 2, characterized in that, as an additional method step, at least one of the two partial sequences ($U'_2(t)$) of voltage pulse and/or the difference sequence have/has an offset DC voltage ($U_{DC}$) superimposed on them/it, the total offset DC voltage being deliberately chosen to be at most so great that the discharge(s) can be extinguished after each voltage pulse and undesirable restriking between the individual voltage pulses is avoided.

4. Method according to claim 3, characterized by an additional method step in which, during each of the pauses, the offset DC voltage is pulsed at the common reference-earth potential.

5. Circuit arrangement for producing pulsed-voltage sequences according to the method according to claim 2, for the operation of discharge lamps (8) by means of a pulsed discharge which is impeded dielectrically, having a first pulse circuit (1) having two output poles (b, c) and a control input (a), which pulse circuit (1) is suitable for supplying a first sequence ($U_1$) of voltage pulses which are separated from one another by pauses, a second pulse circuit (2) having two output poles (e, f) and a control input (d), which pulse circuit (2) is suitable for supplying a second sequence ($U_2$) of voltage pulses which are separated from one another by pauses, one of the two output poles (c) of the first pulse circuit (1) being connected to the output pole (e) of opposite polarity of the second pulse circuit (2), as a result of which a difference sequence ($U_3$) of voltage pulses can be tapped off between the free output poles (b, f) of the two pulse circuits (1, 2), which difference sequence ($U_3$) corresponds to the difference between the two individual sequences ($U_1$, $U_2$) of voltage pulses related to the reference-earth potential, a timer circuit (3) which is connected to the control inputs (a, d) of the two pulse circuits (1, 2) and drives the latter in such a manner that the two pulsed-voltage sequences ($U_1$, $U_2$) are synchronized to one another.

6. Method according to claim 1, characterized in that, as an additional method step, at least one of the two partial sequences ($U'_2(t)$) of voltage pulse and/or the difference sequence have/has an offset DC voltage ($U_{DC}$) superimposed on them/it, the total offset DC voltage being deliberately chosen to be at most so great that the discharge(s) can be extinguished after each voltage pulse and undesirable restriking between the individual voltage pulses is avoided.

7. Method according to claim 6, characterized by an additional method step in which, during each of the pauses, the offset DC voltage is pulsed at the common reference-earth potential.

8. Circuit arrangement for producing pulsed-voltage sequences according to the method according to claim 4, for the operation of discharge lamps (8) by means of a pulsed discharge which is impeded dielectrically, having a first pulse circuit (1) having two output poles (b, c) and a control input (a), which pulse circuit (1) is suitable for supplying a first sequence ($U_1$) of voltage pulses which are separated from one another by pauses, a second pulse circuit (2) having two output poles (e, f) and a control input (d), which pulse circuit (2) is suitable for supplying a second sequence ($U_2$) of voltage pulses which are separated from one another by pauses, one of the two output poles (c) of the first pulse circuit (1) being connected to the output pole (e) of opposite polarity of the second pulse circuit (2), as a result of which a difference sequence ($U_3$) of voltage pulses can be tapped off between the free output poles (b, f) of the two pulse circuits (1, 2), which difference sequence ($U_3$) corresponds to the difference between the two individual sequences ($U_1$, $U_2$) of voltage pulses related to the reference-earth potential, a timer circuit (3) which is connected to the control inputs (a, d) of the two pulse circuits (1, 2) and drives the latter in such a manner that the two pulsed-voltage sequences ($U_1$, $U_2$) are synchronized to one another.

9. Circuit arrangement for producing pulsed-voltage sequences according to the method according to claim 3, for the operation of discharge lamps (8) by means of a pulsed discharge which is impeded dielectrically, having a first pulse circuit (1) having two output poles (b, c) and a control input (a), which pulse circuit (1) is suitable for supplying a first sequence ($U_1$) of voltage pulses which are separated from one another by pauses, a second pulse circuit (2) having two output poles (e, f) and a control input (d), which pulse circuit (2) is suitable for supplying a second sequence ($U_2$) of voltage pulses which are separated from one another by pauses, one of the two output poles (c) of the first pulse circuit (1) being connected to the output pole (e) of opposite polarity of the second pulse circuit (2), as a result of which a difference sequence ($U_3$) of voltage pulses can be tapped off between the free output poles (b, f) of the two pulse circuits (1, 2), which difference sequence ($U_3$) corresponds to the difference between the two individual sequences ($U_1$, $U_2$) of voltage pulses related to the reference-earth potential, a timer circuit (3) which is connected to the control inputs (a, d) of the two pulse circuits (1, 2) and drives the latter in such a manner that the two pulsed-voltage sequences ($U_1$, $U_2$) are synchronized to one another.

10. Circuit arrangement for producing pulsed-voltage sequences according to the method according to claim 7 for the operation of discharge lamps (8) by means of a pulsed discharge which is impeded dielectrically, having a first pulse circuit (1) having two output poles (b, c) and a control input (a), which pulse circuit (1) is suitable for supplying a first sequence ($U_1$) of voltage pulses which are separated from one another by pauses, a second pulse circuit (2) having two output poles (e, f) and a control input (d), which pulse circuit (2) is suitable for supplying a second sequence ($U_2$) of voltage pulses which are separated from one another by pauses, one of the two output poles (c) of the first pulse circuit (1) being connected to the output pole (e) of opposite polarity of the second pulse circuit (2), as a result of which a difference sequence ($U_3$) of voltage pulses can be tapped off between the free output poles (b, f) of the two pulse circuits (1, 2), which difference sequence ($U_3$) corresponds to the difference between the two individual sequences ($U_1$, $U_2$) of voltage pulses related to the reference-earth potential, a timer circuit (3) which is connected to the control inputs (a, d) of the two pulse circuits (1, 2) and drives the latter in such a manner that the two pulsed-voltage sequences ($U_1$, $U_2$) are synchronized to one another.

11. Circuit arrangement according to claim 10, characterized in that the connection of the output poles (c, e) of opposite polarity between the two pulse circuits (1, 2) is connected to a reference-earth potential from the circuit arrangement.

12. Circuit arrangement according to claim 11, characterized in that the reference-earth potential is the earth potential.

13. Circuit arrangement according to claim 12, characterized in that the second pulse circuit comprises an invertor circuit, which inverts the second sequence of voltage pulses with respect to the first sequence.

14. Circuit arrangement according to claim 12, characterized by an additional DC circuit, one pole of which is connected to the free output pole of opposite polarity of the pulse circuit.

15. Circuit arrangement according to claim 11, characterized in that the second pulse circuit comprises an invertor circuit, which inverts the second sequence of voltage pulses with respect to the first sequence.

16. Circuit arrangement according to claim 11, characterized by an additional DC circuit, one pole of which is connected to the free output pole of opposite polarity of the pulse circuit.

17. Circuit arrangement according to claim 10, characterized in that the second pulse circuit comprises an invertor circuit, which inverts the second sequence of voltage pulses with respect to the first sequence.

18. Lighting system having a radiation source (8), in particular a discharge lamp, which radiation source (8) is suitable for a discharge which is impeded dielectrically, the radiation source (8) comprising the following:

an at least partially transparent discharge vessel (8), which is closed and filled with a gas filling or is open and has a gas or a gas mixture flowing through it and is composed of electrically non-conductive material, and electrodes (10, 11), at least the electrodes (11) of one polarity being isolated from the interior of the discharge vessel (9) by dielectric material (19), a pulsed-voltage source (1–3) which is connected to the electrodes (10, 11) and is suitable for supplying voltage pulses which are separated from one another by pauses, characterized in that the pulsed-voltage source (1–3) has a circuit arrangement having the features of claim 10.

19. Circuit arrangement according to claim 10, characterized by an additional DC circuit, one pole of which is connected to the free output pole of opposite polarity of the pulse circuit.

20. Lighting system having a radiation source (8), in particular a discharge lamp, which radiation source (8) is suitable for a discharge which is impeded dielectrically, the radiation source (8) comprising the following:

an at least partially transparent discharge vessel (8), which is closed and filled with a gas filling or is open and has a gas or a gas mixture flowing through it and is composed of electrically non-conductive material, and electrodes (10, 11), at least the electrodes (11) of one polarity being isolated from the interior of the discharge vessel (9) by dielectric material (19), a pulsed-voltage source (1–3) which is connected to the electrodes (10, 11) and is suitable for supplying voltage pulses which are separated from one another by pauses, characterized in that the pulsed-voltage source (1–3) has a circuit arrangement having the features of claim 5.

\* \* \* \* \*